(12) United States Patent
Wang

(10) Patent No.: US 12,741,594 B2
(45) Date of Patent: Sep. 22, 2026

(54) VEHICLE BODY PANELS FOR SPEAKERS, SPEAKER ASSEMBLIES WITH VEHICLE BODY PANELS, AND INSTALLATION METHODS THEREFORE

(71) Applicant: Harman Becker Automotive Systems GmbH, Karlsbad (DE)

(72) Inventor: Jian Wang, Jiangsu (CN)

(73) Assignee: Harman Becker Automotive Systems GmbH, Karlsbad (DE)

( * ) Notice: Subject to any disclaimer, the term of this patent is extended or adjusted under 35 U.S.C. 154(b) by 146 days.

(21) Appl. No.: 18/591,412

(22) Filed: Feb. 29, 2024

(65) Prior Publication Data

US 2025/0276655 A1 Sep. 4, 2025

(51) Int. Cl.
*B60R 11/02* (2006.01)
*B60R 11/00* (2006.01)

(52) U.S. Cl.
CPC ... *B60R 11/0217* (2013.01); *B60R 2011/0022* (2013.01); *B60R 2011/005* (2013.01)

(58) Field of Classification Search
CPC ......... B60R 11/0217; B60R 2011/0022; B60R 2011/005; B60R 2011/0019; H04R 1/025; H04R 1/2811; H04R 2499/13
See application file for complete search history.

(56) References Cited

U.S. PATENT DOCUMENTS

| | | | | |
|---|---|---|---|---|
| 11,589,156 B1 | | 2/2023 | Hebbar et al. | |
| 2021/0204046 A1 | | 7/2021 | Winton et al. | |
| 2022/0089098 A1 | * | 3/2022 | Mutsura .............. | B60R 11/0217 |
| 2022/0379819 A1 | | 12/2022 | Hamme et al. | |
| 2023/0202405 A1 | * | 6/2023 | Shao .................. | B60R 11/0217 381/86 |
| 2023/0242046 A1 | * | 8/2023 | Velican .............. | B60R 11/0217 |

FOREIGN PATENT DOCUMENTS

| | | | |
|---|---|---|---|
| CN | 216960109 U | * | 7/2022 |
| JP | S5757687 U | | 4/1982 |
| JP | 2004208067 A | * | 7/2004 |

OTHER PUBLICATIONS

Extended European Search Report for Application No. 25159283.8, dated Jun. 24, 2025, 7 pages.

* cited by examiner

*Primary Examiner* — Yogeshkumar Patel
(74) *Attorney, Agent, or Firm* — Brooks Kushman P.C.

(57) ABSTRACT

A vehicle body panel is provided defining an internal cavity that is acoustically sealed at least partially along a perimeter with an opening in the vehicle body panel for access to the internal cavity and sized to receive a speaker in the opening. A speaker assembly is provided with the speaker is installed in the opening. A speaker assembly is provided with a first vehicle body panel with an opening. A speaker is installed in the opening. A second vehicle body panel is attached to the first vehicle body panel and sealed along a connection with the first vehicle body panel to collectively provide an internal cavity accessible at the opening, to provide a resonation chamber for the speaker. A method is provided by sealing a plurality of vehicle body panels. A speaker is installed in an opening in the plurality of sealed vehicle body panels.

14 Claims, 8 Drawing Sheets

VEHICLE BODY PANELS FOR SPEAKERS, SPEAKER ASSEMBLIES WITH VEHICLE BODY PANELS, AND INSTALLATION METHODS THEREFORE

TECHNICAL FIELD

Various embodiments relate to vehicle body panels, speaker assemblies, and installation methods, therefore.

BACKGROUND

The prior has provided speaker assemblies in vehicle bodies by installing speaker assemblies to trim components that are attached to the vehicle body.

SUMMARY

According to an embodiment, an apparatus is provided as a vehicle body panel defining an internal cavity that is acoustically sealed at least partially along a perimeter with an opening in the vehicle body panel for access to the internal cavity and sized to receive a speaker in the opening.

According to a further embodiment, the internal cavity provides a resonation chamber for the speaker.

According to an even further embodiment, a port is formed through the vehicle body panel to port the resonation chamber.

According to an even further embodiment, the port further provides a tube.

According to another even further embodiment, the port is vented externally of the vehicle body panel.

According to another further embodiment, the vehicle body panel is formed from sheet metal.

According to another embodiment, a vehicle body panel is provided defining an internal cavity that is acoustically sealed at least partially along a perimeter with an opening in the vehicle body panel for access to the internal cavity and sized to receive a speaker in the opening. The vehicle body panel is further defined as a first vehicle body panel. A second vehicle body panel is attached to the first vehicle body panel to collectively provide the internal cavity.

According to a further embodiment, the second vehicle body panel is welded to the first vehicle body panel.

According to another further embodiment, the first vehicle body panel and the second vehicle body panel collectively provide a pillar.

According to another further embodiment, a third vehicle body panel is connected to the first vehicle body panel and the second vehicle body panel to enclose a region between the first vehicle body panel and the second body panel to at least partially enclose the internal cavity.

According to an even further embodiment, a port is formed through the third vehicle body panel to port the internal cavity.

According to another embodiment, a speaker assembly is provided with a vehicle body panel defining an internal cavity that is acoustically sealed at least partially along a perimeter with an opening in the vehicle body panel for access to the internal cavity and sized to receive a speaker in the opening. The speaker is installed in the opening.

According to a further embodiment, the speaker is further provided as a cone speaker.

According to another further embodiment, the speaker is further provided as a sub-woofer.

According to another further embodiment, the speaker extends at least partially into the internal cavity.

According to another further embodiment, a resonation chamber is provided, wherein the speaker is installed to an opening in the resonation chamber, and wherein the resonation chamber is installed in the opening in the vehicle body panel.

According to an even further embodiment, the resonation chamber extends at least partially into the internal cavity.

According to another embodiment, a speaker assembly is provided with a first vehicle body panel with an opening. A speaker is installed in the opening. A second vehicle body panel is attached to the first vehicle body panel and sealed along a connection with the first vehicle body panel to collectively provide an internal cavity accessible at the opening, to provide a resonation chamber for the speaker.

According to another embodiment, a method is provided by sealing a plurality of vehicle body panels. A speaker is installed in an opening in the plurality of sealed vehicle body panels.

According to a further embodiment, a port is formed in the plurality of sealed vehicle body panels.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
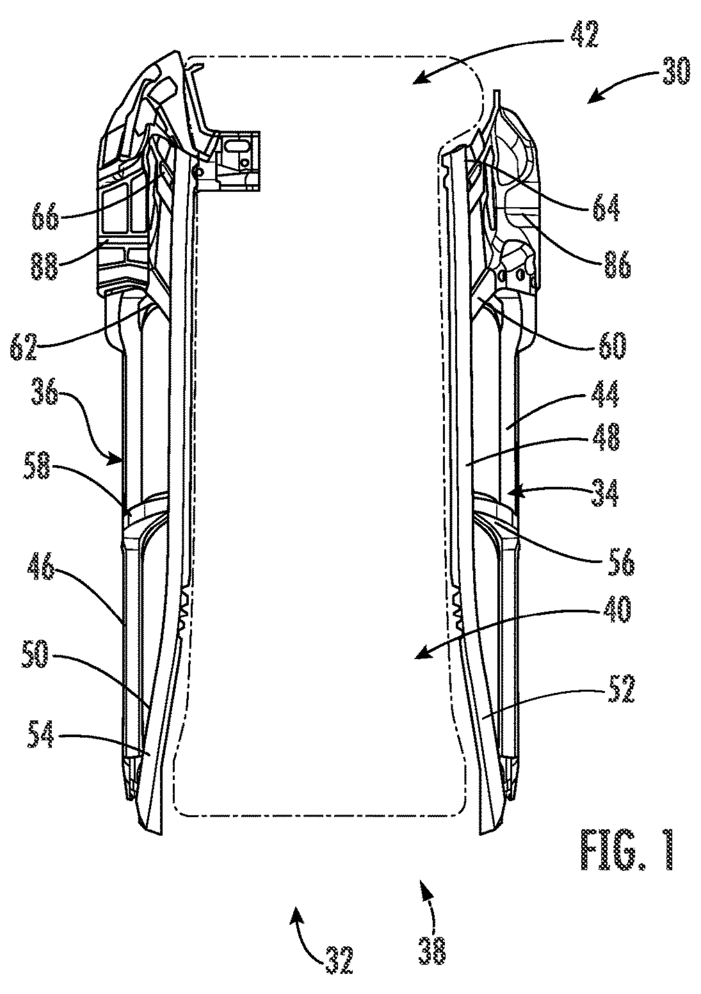
FIG. 1 is a top exterior view of a partially assembled vehicle body according to an embodiment.
Figure 2:
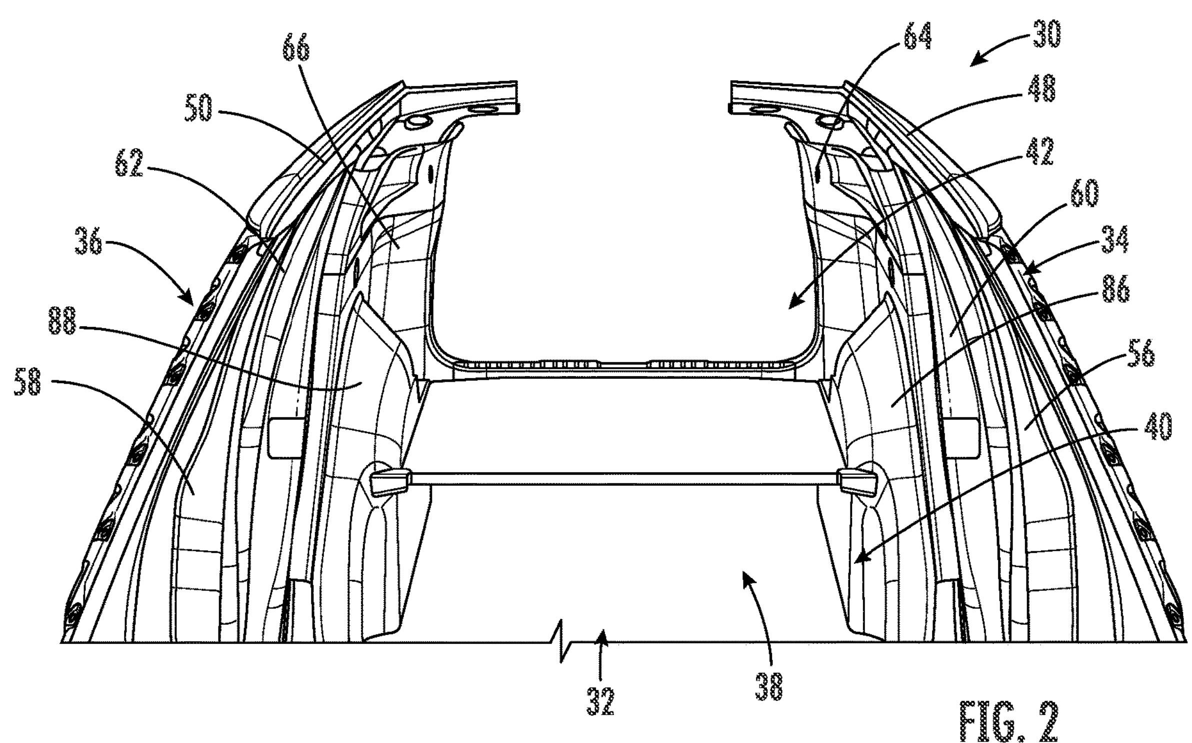
FIG. 2 is a front perspective view of an interior of the partially assembled vehicle body of FIG. 1 facing a rear region of the vehicle body.

FIG. 1 is a top view of a partially assembled vehicle body 30. The vehicle body 30 is illustrated as one example of a vehicle body 30. For example, the vehicle body 30 is the body 30 of a passenger land vehicle. The vehicle body 30 may be any vehicle, such as any land vehicle, watercraft, aircraft, or the like. The vehicle body 30 may also be a straddle type vehicle, cargo vehicle, passenger vehicle, or the like.

The vehicle body 30 is illustrated as sheet metal, often referred to as body-in-white. The vehicle body 30 may be formed from other materials, such as polymeric materials, carbon fiber reinforced materials, or the like. The vehicle body 30 may also be formed from a plurality of vehicle body panels as a vehicle body panel assembly 30.

In the depicted embodiment, directions are referred to from the perspective of an external viewer, and not from the perspective of an internal passenger. For example, a direction of a front view 32 is depicted by arrow 32. In contrast, the front view 32 is opposite to a direction of travel of the vehicle. The description of directions in FIG. 1 are aligned with the external viewer as discussed by an installer, not an internal occupant within the vehicle body 30. Therefore, the front view 32 is in a direction from a front of the vehicle to a rear of the vehicle.

The vehicle body 30 includes a first side 34 and a second side 36. The sides 34, 36 are labeled by order of introduction in the figures and do not denote any other difference. For example, the first side 34 is illustrated as a right side, when described from the exterior, which may be a driver side in North America, or a passenger side in other jurisdictions. The second side is illustrated as a left side, when described from the exterior, which may be a passenger side in North America. Each vehicle body side 34, 36 may be formed from stamped sheet metal as is known in the art for attachment to a vehicle chassis. The vehicle body sides 34 and 36 are generally spaced apart to enclose and define a vehicle interior 38. The vehicle interior 38 includes a passenger compartment 40 and a cargo compartment 42. The compartments 40, 42 are by way of illustration and example. In other embodiments, the vehicle interior 38 may include only a passenger compartment 40, or a cargo compartment 42. The vehicle interior 38 may receive vehicle interior components therein, such as passenger seating, passenger restraints and safety components that are not illustrated, for example, seat assemblies, seatbelts, airbags, and the like.

The vehicle sides 34, 36 each include a lower rail 44, 46 and an upper rail 48, 50 interconnected by a plurality of pillars 52, 54, 56, 58, 60, 62, 64, 66. The first pillars 52, 54 may be formed integrally with the upper rails 48, 50, and may be referred to as A-pillars 52, 54. The first pillars 52, 54 are spaced apart from the second pillars 56, 58 to provide door openings for occupant ingress into, and egress from, the passenger compartment 40 of the vehicle interior 38. The second pillars 56, 58 may be referred to as B-pillars 56, 58. The third pillars 60, 62 are spaced apart from the second pillars 56, 58 to provide door openings for occupant ingress into, and egress from, the passenger compartment 40 the vehicle interior 38. The third pillars 60, 62 may be referred to as C-pillars 60, 62. The fourth pillars 64, 66 are spaced apart from the third pillars 60, 62 to provide a window opening within the cargo compartment 42. The fourth pillars 64, 66 may be referred to as D-pillars 64, 66. The fourth pillars 64, 66 may converge with the third pillars 60, 62 at the roof rails 48, 50.

Conventionally, trim components are installed upon the pillars 52, 54, 56, 58, 60, 62, 64, 66 within the vehicle interior 38. Various comfort and entertainment features are installed into the trim components, including speaker assemblies. Speaker assemblies are often provided with a speaker cone attached to a speaker box, or a resonation chamber, which is an enclosed or partially enclosed chamber to provide a resonating back pressure to the speaker for quality of acoustics and sound output. Resonation chambers for larger speakers, such as subwoofers, often include a port for intake and exhaust of back pressure to a rear side of the speaker.

Speaker assemblies are often installed in the trim components in the vehicle interior. Vehicle manufacturers, or original equipment manufacturers (OEMs), have been reducing an overall size of vehicles in order to reduce energy requirements of vehicles, and increase efficiencies of vehicles, such as fuel efficiency. In order to maximize and/or optimize the vehicle interior 38, OEMs have been increasing a width of the vehicle interior 38. The increased width of the vehicle interior 38 moves the trim members closer to the pillars 52, 54, 56, 58, 60, 62, 64, 66.

In order to increase the width of the vehicle interior 38, or maintain the width of the vehicle interior 38, a speaker assembly 68 is provided that provides space optimization in comparison to the prior art and is illustrated in FIGS. 3-11. The speaker assembly 68 is integrated into the vehicle body 30 and is not housed solely within a trim member (not shown). As depicted, the speaker assembly 68 includes a cone speaker 70 installed directly to the third pillar 60. In the depicted embodiments, the third pillar 60 is formed from at least panels 72, 74 to define a cavity 76 within the panels 72, 74. Although the third pillar 60 is depicted as two separate panels 72, 74, the third pillar 60 may be formed integrally, such as a hydroformed column, or the like. Although the speaker assembly 68 is illustrated and described in conjunction with the third pillars 60, 62, the speaker assembly 68 may be incorporated and installed into any panel of the vehicle body 30.

An opening 78 is formed into the interior panel 72 that is sized to receive the speaker 70 as illustrated in FIGS. 6-11 to provide access to the cavity 76. The speaker 70 includes a flange 80 that is fastened to the interior panel 72 to mount the speaker 70, and to seal the opening 78 as illustrated in FIGS. 4, and 6-11. The speaker 70 extends at least partially into the cavity 76. The cavity 76 is sealed at least partially along a perimeter of the cavity 76 to control a fluid flow of air pressure within the cavity 76. According to an embodiment, the third pillars 60, 62 are formed from sheet metal that is sealed about the cavity 76, such as by a weld seam, a sealant, or the like. The sealed enclosure of the cavity 76 provides a resonation chamber 76 for the speaker assembly 68.

Figure 3:
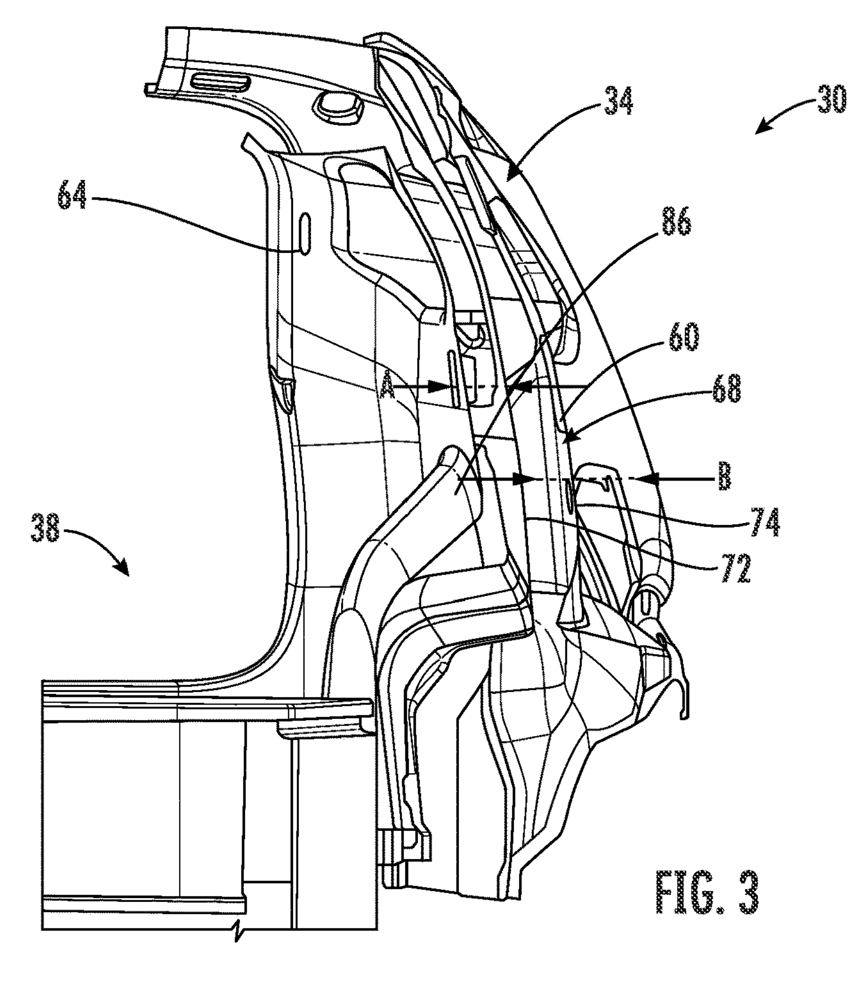
FIG. 3 is an enlarged partial front section view of a first side of the partially assembled vehicle body of FIG. 1.
Figure 4:
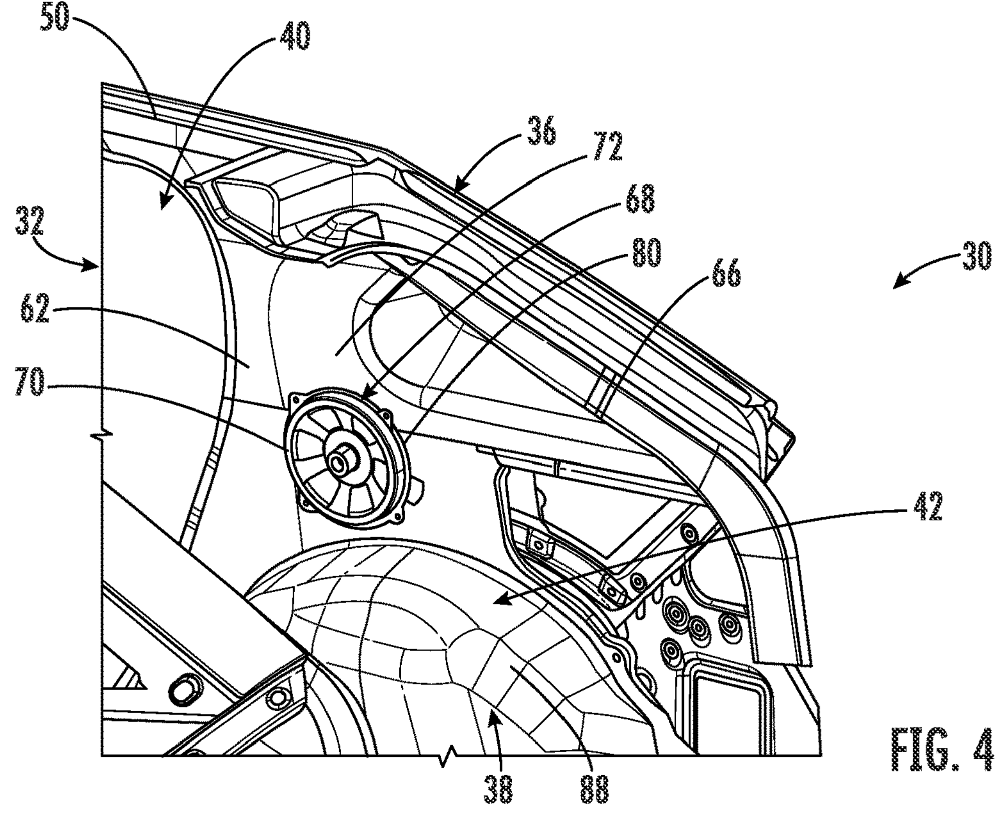
FIG. 4 is an enlarged partial side perspective view of the interior of a second side of the partially assembled vehicle body of FIG. 1.

By utilizing panels 72, 74 of the third pillars 60, 62 as the resonation chamber 76, a separate resonation chamber 76 is not required, that conventionally was housed within trim components within the vehicle interior 38. Therefore, the speaker assembly 68 reduces components by utilizing existing components of the vehicle body 30 while optimizing space within the vehicle interior 38. Referring now to FIG. 3, the resonation chamber 76 is no longer housed within a dimension A within trim components. Instead, the resonation chamber 76 is formed within a dimension B, thereby permitting the trim components to be smaller for a reduction of dimension A.

Figures 5, 6:
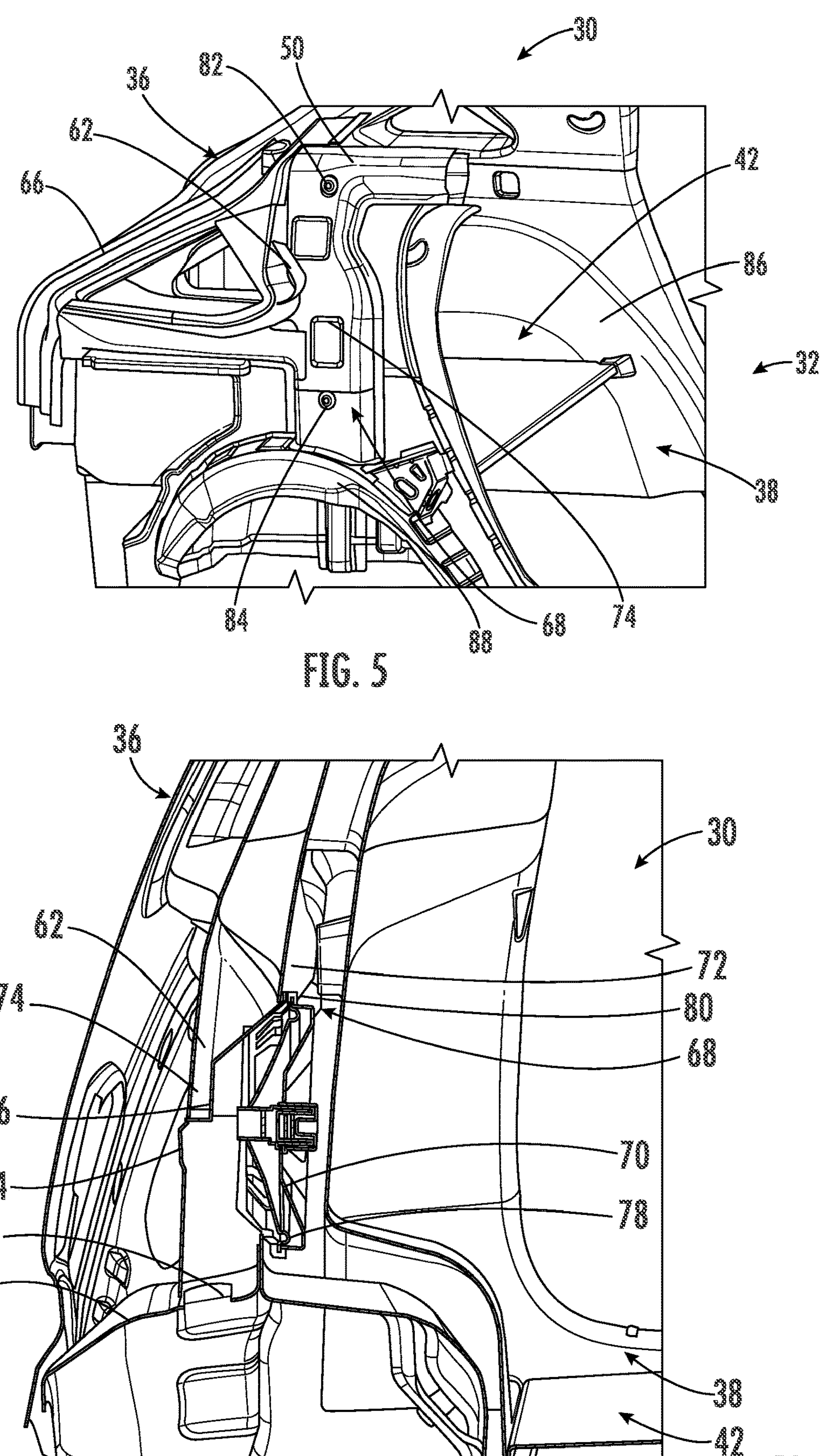
FIG. 5 is an enlarged partial side perspective view of the exterior of the partially assembled vehicle body of FIG. 1.
FIG. 6 is an enlarged front partial section view of the second side of the partially assembled vehicle body of FIG. 1.

FIG. 5 illustrates the third pillar 62 from the exterior of the vehicle body 30. The pillar 62 may include a plurality of ports 82, 84, which may be provided for welding clearance or ventilation, external access to the cavity 76, or any other manufacturing consideration. According to an embodiment, the ports 82, 84 are sealed with plugs or caps to enclose the cavity 76.

Referring now to FIGS. 1-11, the third pillars 60, 62 extend from the roof rails 48, 50 to wheel wells 86, 88, which provide clearance for rear wheels of the vehicle. For particular speakers 70, such as subwoofers 70 or external couple subwoofers 70, a port 90 may be formed through the vehicle body 30 to exhaust the chamber 76 to the exterior of the vehicle body 30. The port 90 is illustrated in FIGS. 6-9 and 11, formed through the wheel wells 86, 88. The port 90 permits ventilation for the resonation chamber 76 for tuning the resonation chamber 76 to balance a back pressure for the speaker 70 by exhaust of pressure in a direction D illustrated in FIG. 7.

Figure 7:
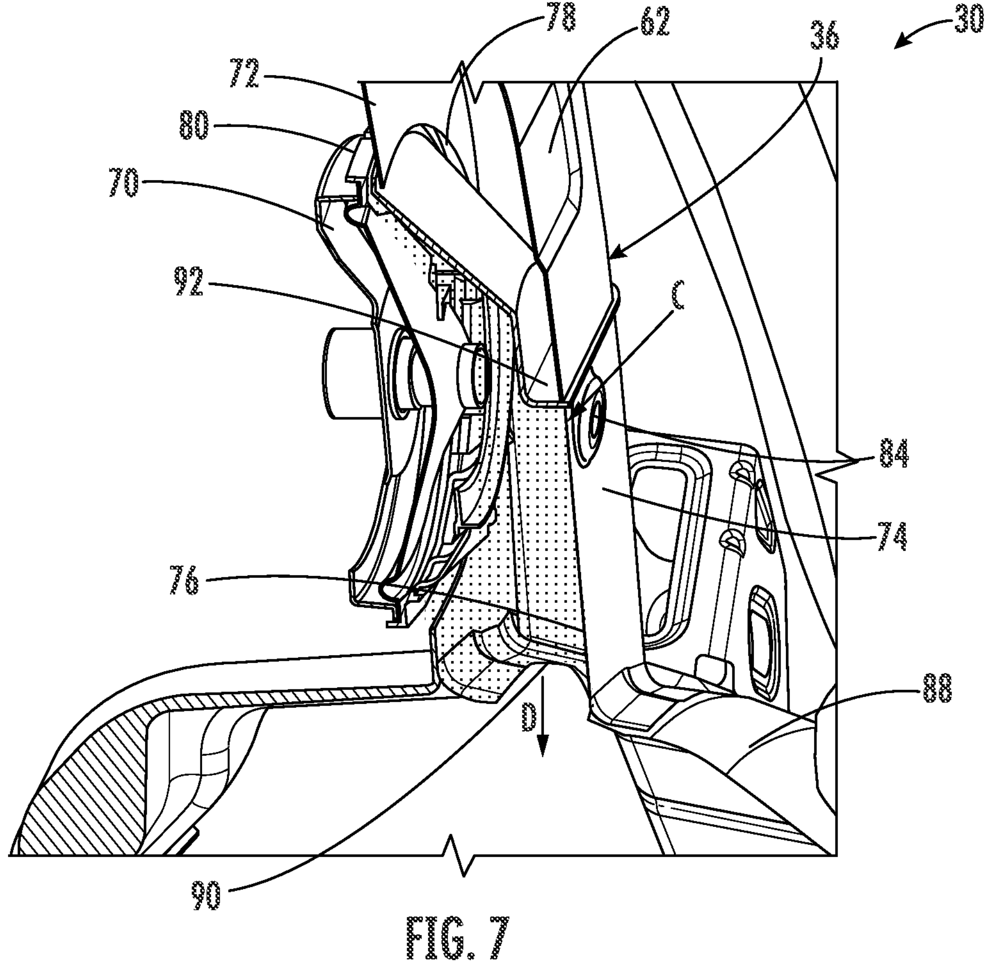
FIG. 7 is an enlarged rear partial section view of the second side of the partially assembled vehicle body of FIG. 1.

Vehicle pillars 52, 54, 56, 58, 60, 62, 64, 66 vary in size, and therefore vary in the size of the cavity 76 therein. Speakers 70 also vary in the resonation chamber 76 size requirements. Referring to FIG. 7, an additional insert panel 92 may be provided in the cavity 76 to reduce the volume of the resonation chamber 76 to a region labeled C. The insert panel 92 extends from the exterior panel 74, toward the speaker 70 and then above the opening 78, and then to the interior panel 72. The insert panel 92 may be welded or otherwise sealed to the interior and exterior panels 72, 74.

Figure 8:
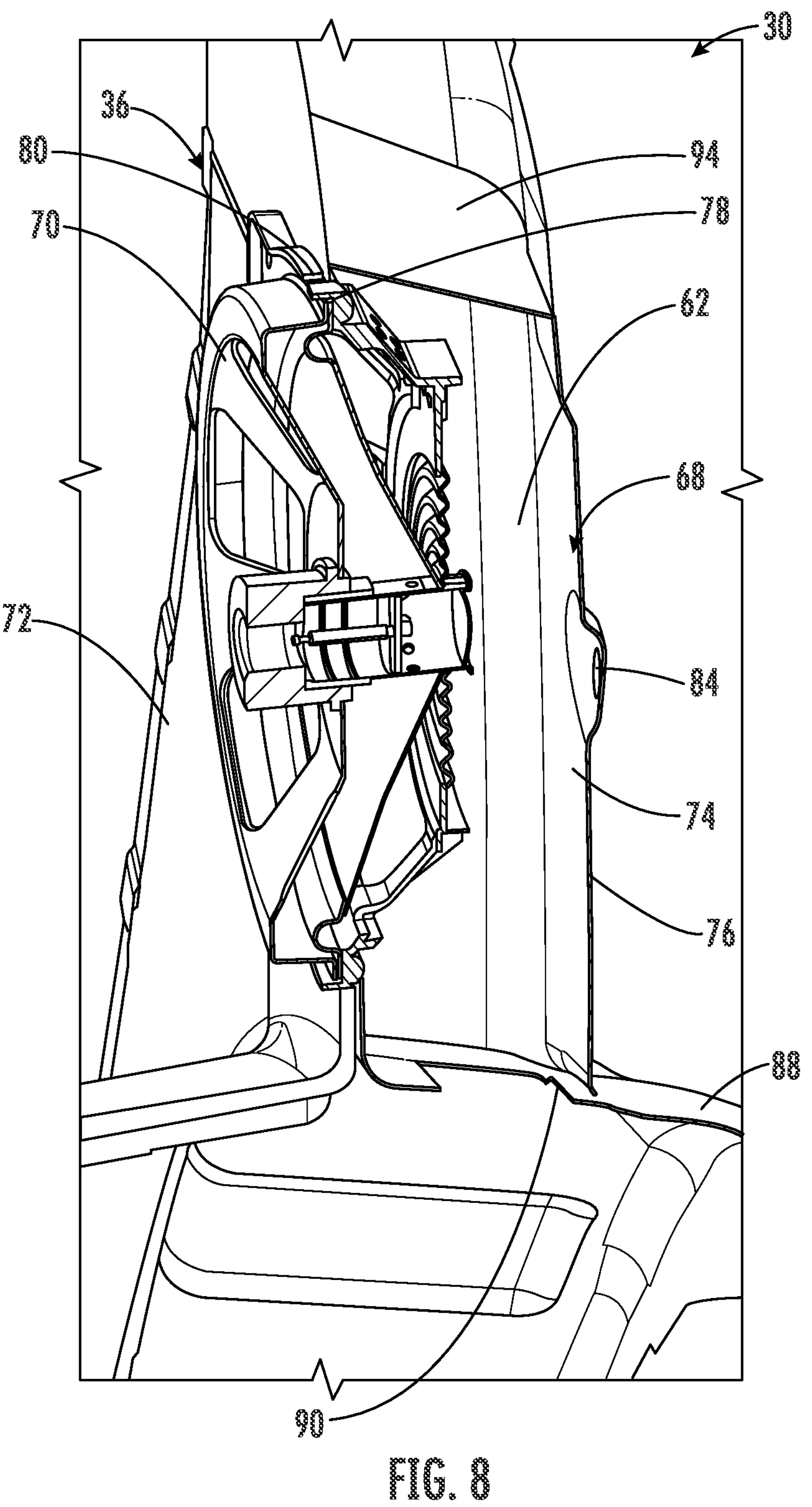
FIG. 8 is an enlarged front partial section view of the second side of the partially assembled vehicle body of FIG. 1.
Figure 9:
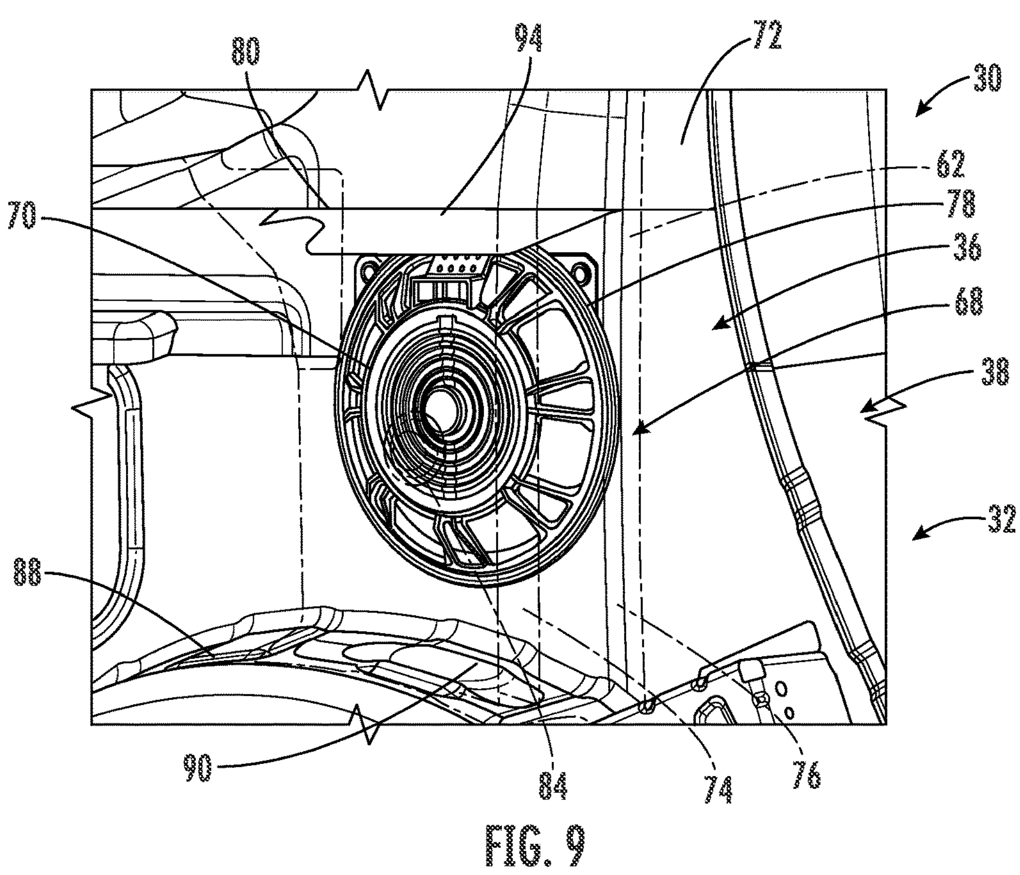
FIG. 9 is an enlarged exterior perspective view of the second side of the partially assembled vehicle body of FIG. 1.

FIGS. 8 and 9 illustrate an insert panel 94 according to another embodiment. The insert panel 94 is formed from a flat sheet of material, such as sheet metal. The insert panel 94 is oriented above the speaker 70, and is welded or otherwise sealed within the cavity 76 to the pillar panels 72, 74. Insert panels 92, 94 of various sizes, shapes, and installation locations permit sizing of the resonation chamber 76 tuned to the particular speaker 70 selected for the application.

Figure 10:
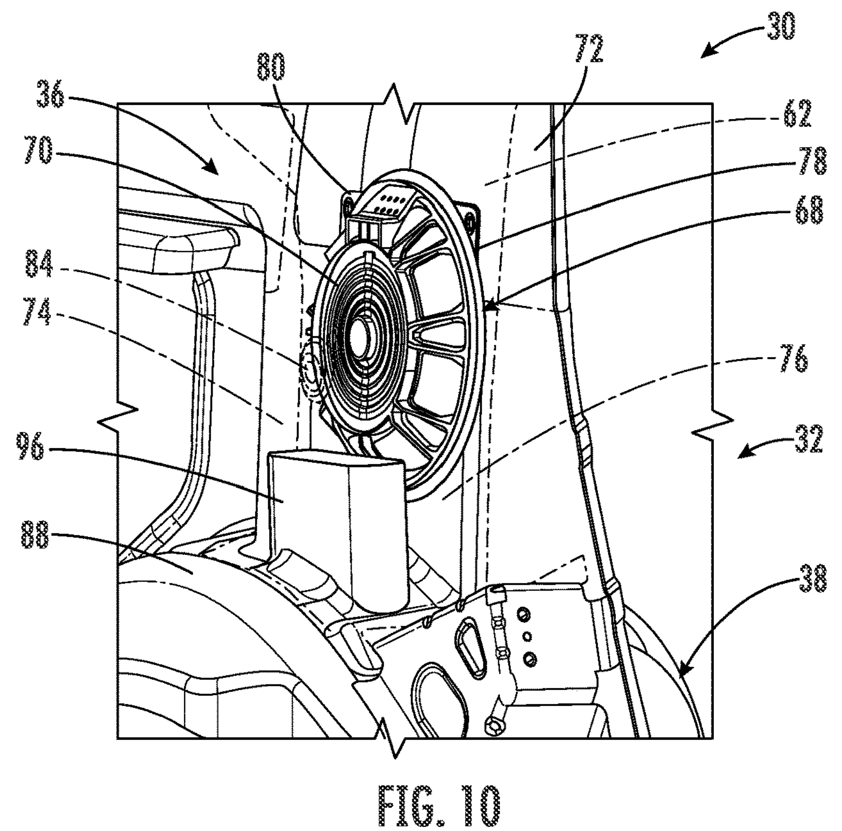
FIG. 10 is another enlarged exterior perspective view of the second side of the partially assembled vehicle body of FIG. 1.
Figure 11:
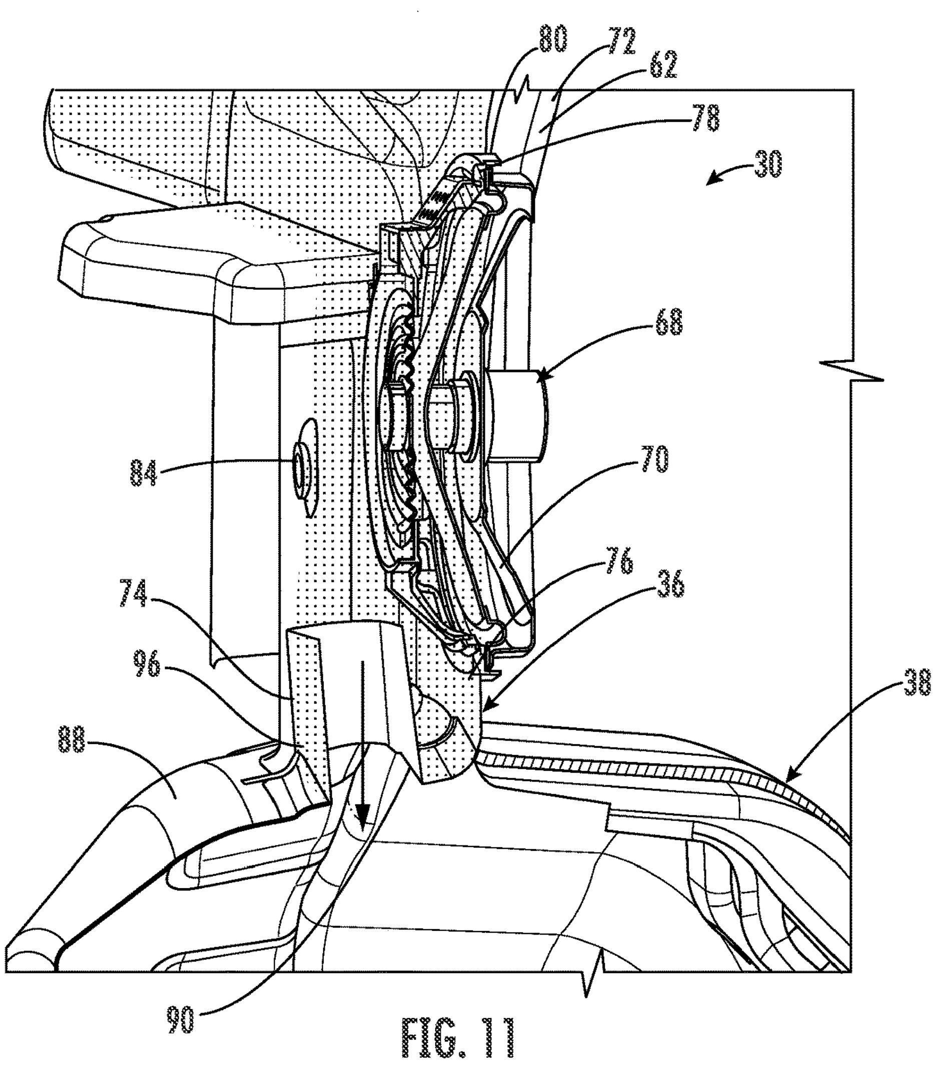
FIG. 11 is an enlarged front partial second view of the second side of the partially assembled vehicle body of FIG. 1.

FIGS. 10 and 11 illustrate that the port 90 may include a tube 96. The tube 96 is welded into the port 90 to extend into the resonation chamber 76 for speaker assemblies 68 that specify the tube 96 within the chamber 76 for tuning the back pressure.

Figure 12:
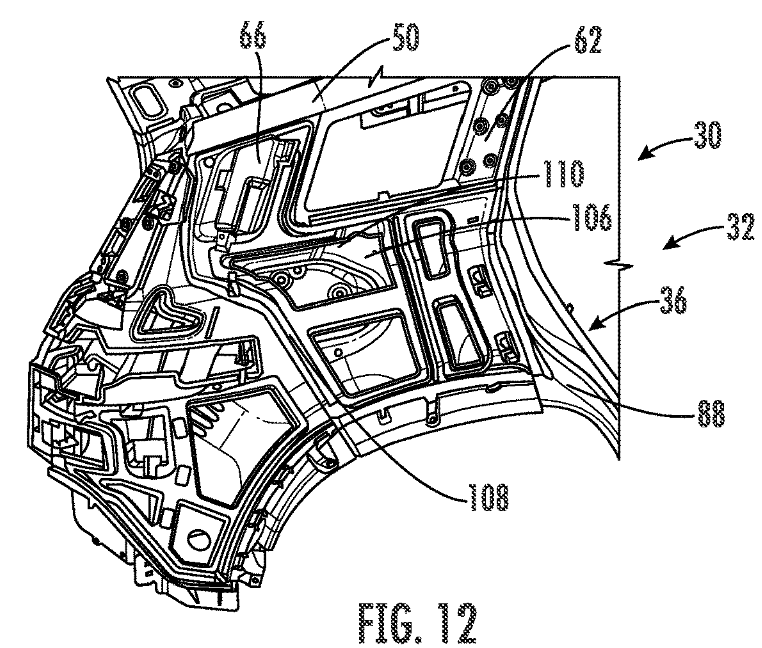
FIG. 12 is a side perspective exterior view of a rear region of a partially assembled vehicle body according to another embodiment.
Figure 13:
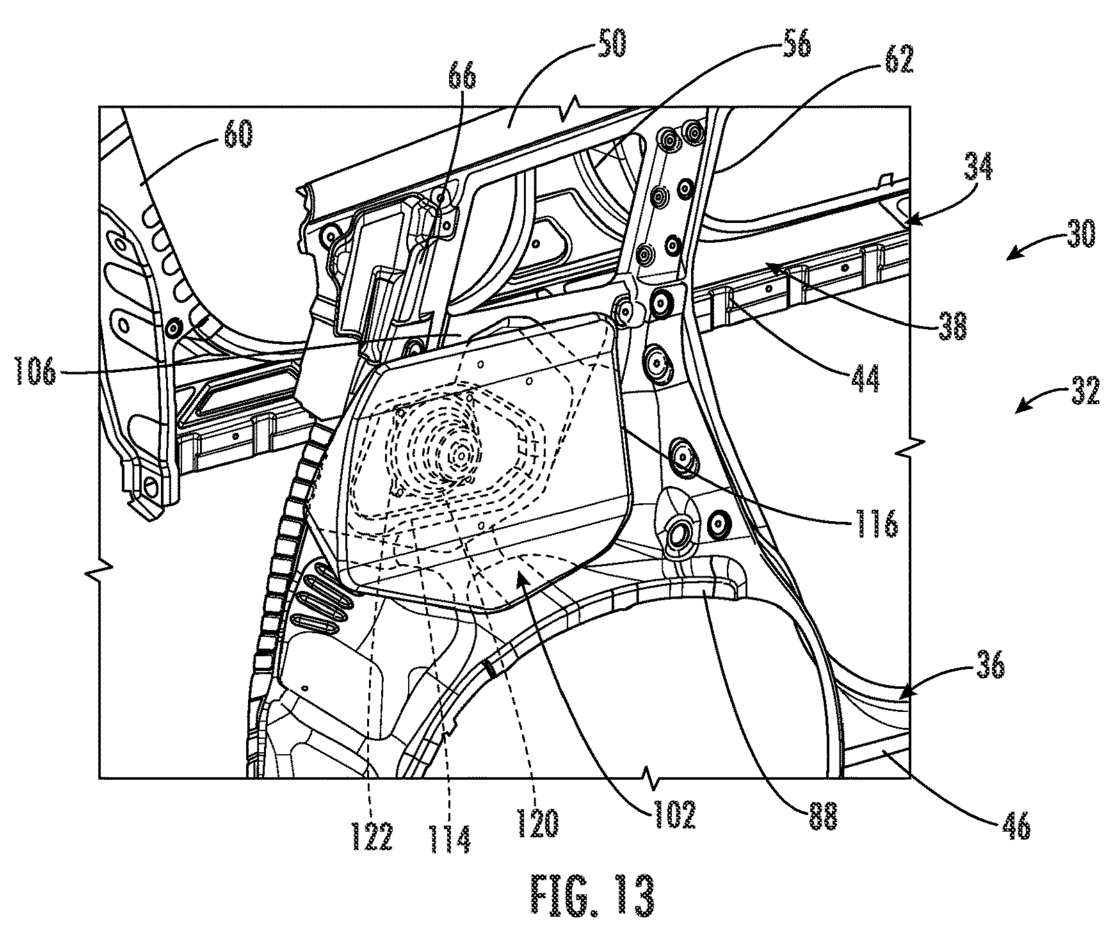
FIG. 13 is an enlarged side perspective exterior view of the rear region of the partially assembled vehicle body of FIG. 12.
Figure 14:
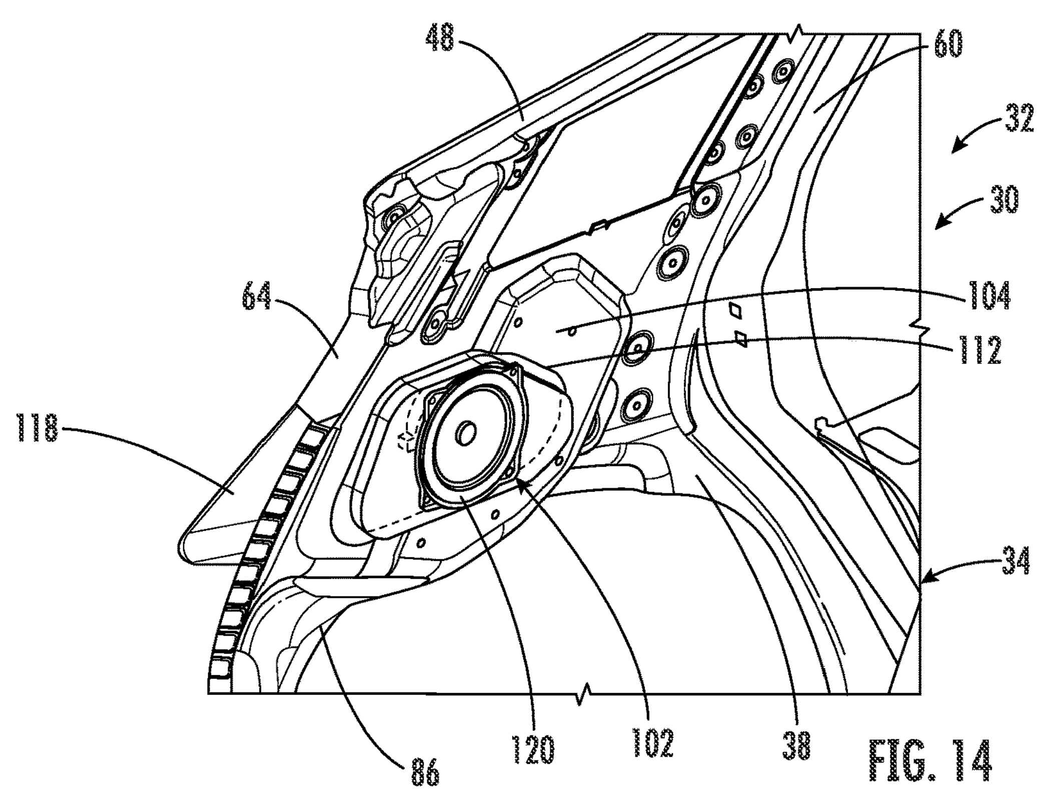
FIG. 14 is an enlarged side perspective interior view of the rear region of the partially assembled vehicle body of FIG. 12.

FIGS. 12-14 illustrate the vehicle body 30 for application of a speaker assembly 102 according to another embodiment. The vehicle body 30 includes an interior rear quarter panel 104, 106 for each vehicle body side 34, 36. Each rear quarter panel 104, 106 is bounded by the corresponding third and fourth pillars 60, 62, 64, 66 and the corresponding wheel well 86, 88. FIG. 12 illustrates the vehicle body 30 with a decorative skin or decorative panel uninstalled. The vehicle body 30 may include an outboard quarter panel frame 108. The interior rear quarter panel 106 and the outboard quarter panel frame 108 collectively provide a cavity 110 therebetween.

FIGS. 13 and 14 illustrate the speaker assembly 102 partially oriented within the cavity 110 for each side 34, 36 of the vehicle body 30. An opening 112, 114 is formed through each interior rear quarter panel 104, 106. The openings 112, 114 permit access to the cavity 110 of each vehicle body side 34, 36. The speaker assembly 102 of each side includes a resonation chamber 116, 118 that is oriented primarily within the cavity 110, and at least partially through the respective opening 112, 114. The resonation chamber 116, 118 provides a speaker box or enclosure, and may be formed from a polymeric material, or any suitable structural material. The resonation chambers 116, 118 may be installed in the vehicle during, or after the assembly of the vehicle body 30.

The speaker assembly 102 includes a cone speaker 120 installed to an opening 122 in the resonation chamber 116, 118 to face into the vehicle interior 38. The speaker assembly 102 orients the majority of the resonation chamber 116, 118 and the speaker 120 into the interior rear quarter panel 104, 106 to minimize a thickness of a trim cover upon the interior rear quarter panel 104, 106 and to maximize the size of the vehicle interior 38. The speaker assembly 102 may be preassembled prior to assembly to the vehicle body 30.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A speaker assembly comprising:

a first vehicle body panel formed from sheet metal;

a second vehicle body panel formed from sheet metal and attached to the first vehicle body panel;

wherein the first vehicle body panel and the second vehicle body panel collectively define an internal cavity that is acoustically sealed at least partially along a perimeter with an opening in the first vehicle body panel for access to the internal cavity and sized to receive a speaker in the opening facing an interior of a vehicle body;

wherein the internal cavity provides a resonation chamber for the speaker;

a port formed through the second vehicle body panel to port the resonation chamber;

wherein the port is vented externally of the interior of the first vehicle body panel;

an insert vehicle body panel extending between the first vehicle body panel and the second vehicle body panel to enclose a region of the internal cavity, wherein the insert vehicle body panel reduces a volume of the resonation chamber to tune the resonation chamber to the speaker; and the speaker installed directly in the opening in the first vehicle body panel.

2. The speaker assembly of claim 1 wherein the port further comprises a tube.

3. The speaker assembly of claim 1 wherein the second vehicle body panel is welded to the first vehicle body panel.

4. The speaker assembly of claim 1 wherein the first vehicle body panel and the second vehicle body panel collectively provide a pillar.

5. The speaker assembly of claim 1 wherein the port is formed through the insert vehicle body panel to port the internal cavity.

6. The speaker assembly of claim 1 wherein the speaker further comprises a cone speaker.

7. The speaker assembly of claim 1 wherein the speaker further comprises a sub-woofer.

8. The speaker assembly of claim 1 wherein the speaker extends at least partially into the internal cavity.

9. The speaker assembly of claim 2 wherein the tube extends into the resonation chamber.

10. The speaker assembly of claim 1 wherein the speaker assembly is integrated into the vehicle body and is not housed solely within a trim member.

11. A speaker assembly for installation in an opening in an interior rear quarter panel, the speaker assembly comprising:

a speaker box defining a resonation chamber, the resonation chamber sized to be oriented primarily within an internal cavity between the interior rear quarter panel and an outboard quarter panel frame, the speaker box having an opening; and a speaker preassembled in the speaker box opening.

12. The speaker assembly of claim 11 wherein a majority of the speaker box extends into the internal cavity.

13. The speaker assembly of claim 1 further comprising:

a wheel well panel attached to the first vehicle body panel and the second vehicle body panel to collectively provide an internal cavity that is acoustically sealed at least partially along a perimeter; and wherein the port is formed through the wheel well panel to exhaust the internal cavity to an exterior of a vehicle body.

14. The speaker assembly of claim 11, wherein the speaker box is formed from a polymeric material.

* * * * *